Feb. 3, 1925.

S. S. MATTHES 1,524,941

NONALIGNING TROLLEY HEAD

Filed Sept. 20, 1921

Witness
H. J. Stromberger.

Inventor
Samuel S. Matthes.
By
Attorney

Patented Feb. 3, 1925.

1,524,941

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

NONALIGNING TROLLEY HEAD.

Application filed September 20, 1921. Serial No. 501,949.

*To all whom it may concern:*

Be it known that I, SAMUEL S. MATTHES, a citizen of the United States of America, residing at Mansfield, in the county of Richland and State of Ohio, have invented certain new and useful Improvements in Nonaligning Trolley Heads, of which the following is a specification.

My invention relates to trolley harps or trolley heads used in collecting electric current from a conductor and has special application where the trolley pole or support to which the harp is attached is secured to a car or bus which may travel to either side of the center line of the trolley wire or directly in line therewith, as is the case with what is known as trackless trolley operation.

The object of my invention is to produce a harp in which the contacting element which may be a grooved wheel or roller or sliding contactor is mounted to pivot freely and maintain its alinement with the trolley wire at all times and under all conditions. There are harps known as aligning harps which have the contacting element yieldably held in a predetermined position relative to the other parts of the harp thereby permitting the contacting element to swing or pivot out of its predetermined position but which is returned to its normal position under action of means provided for such functioning. Usually such movement is opposed by the aligning means.

In my invention I mount the collecting element to swing or pivot freely as the trolley pole to which the invention is secured may at times make an angle to either side of the trolley wire as great as 45° to 60°, and this requires not only great freedom to respond quickly to any movement of the trolley pole out of alinement with the trolley wire but a wide range of rotation. It is also the object of my invention to provide means for conducting the current as directly and as efficiently as possible from the trolley wires to the car or bus. I also provide means to protect the invention from "fouling" or becoming entangled with the trolley and support wires should the device embodying my invention jump the trolley wire. It will be very apparent that should the current collecting device leave the trolley wire and the contactor be rotated sufficiently from alinement with the axis of the pole that the trolley wire could very easily become lodged in the space between the contactor and adjacent parts of the device and great damage result to the overhead wires, to current collector and possibly roof of the bus. I overcome this fault by keeping the clearance at all times, between the contactor and adjacent parts where the wire is liable to catch sufficiently small to prevent such results as will be explained more fully.

It is usual in trackless trolley operation to use a car or bus with rubber tires thereby electrically insulating the wheels from the ground and requiring the use of two trolley conductors, a positive and a negative, and therefore two collector devices must be used and insulated from each other. These collectors may be mounted on separate poles acting independent of each other or on the same pole but electrically insulated from each other and when used on separate poles it is advisable to insulate each collector from its pole, as the bus end of the pole is secured to a trolley base which as is well known, occupies considerable space and allows only a small clearance between the bases to insulate one from the other.

In the drawing accompanying this specification—

Figure 1:
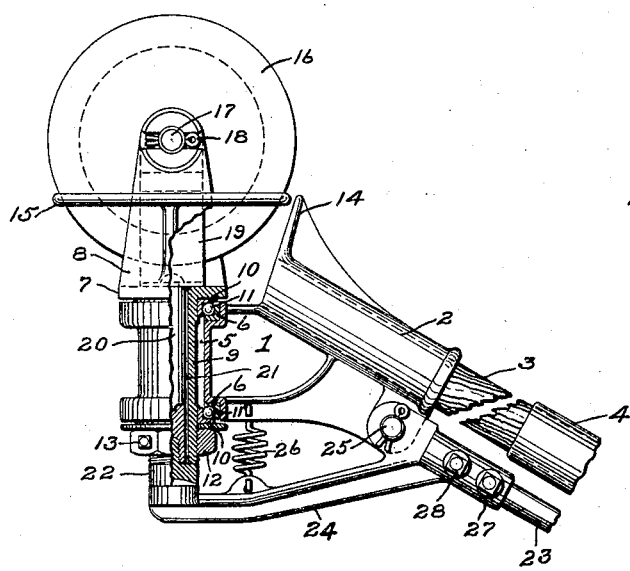
Fig. 1 shows a side elevation of my invention.
Figure 2:
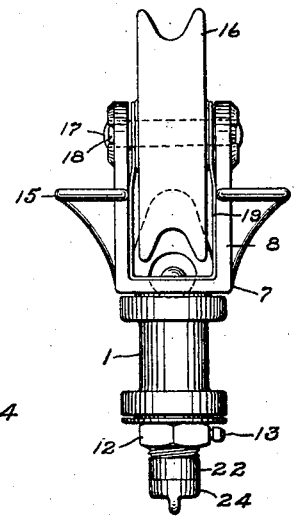
Fig. 2 shows a front end elevation of my invention.
Figure 3:
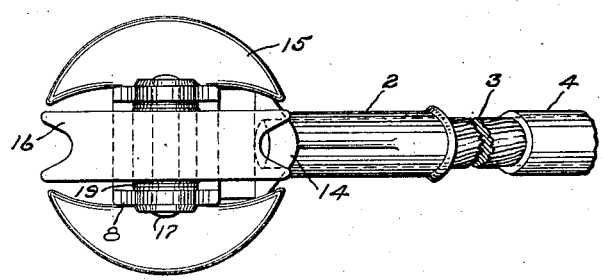
Fig. 3 shows a top plan view of my invention.

In the preferred form of my invention I employ a body member 1 which is provided with a socket 2 to receive an insulating member 3 which in turn is secured to a trolley pole 4, or the end of the pole 4 may be inserted within the socket 2. The member 1 is provided with a channel 5 having enlarged openings at each end and in which enlarged openings are mounted ball-races 6—6, preferably of hardened steel.

Mounted in the channel 5 is a harp member 7 provided with standards 8 and projecting stem 9. Mounted on the stem 9 are spaced ball-races 10 also preferably of hardened steel. Operating in each pair of ball-races 6 and 10 are a plurality of steel balls 11 whereby the rotation or pivoting of the fork member 7 is made to act freely and as frictionless as possible. To the lower end of the stem 9 is a nut 12 for adjusting the tension upon the ball bearings and the adjustment is locked by the set screw 13. The member 12 also holds the above parts in assembled relation.

Secured to the body member is an upright member 14 which operates to close the opening found between the contactor wheel and body member at the front side to prevent cross span supporting wires from becoming caught by the collector when the collector is in alinement with the axis of the pole. When the collector is turned at an angle to the axis of the pole the space formed with the member 14 is enlarged and to prevent the trolley head becoming entangled with the overhead structure the protecting members 15 of circular formation are secured to the fork members 8 which maintain the opening between the rotatable forked member 7 and the body member practically uniform regardless of the rotation of the forked member and contactor.

Mounted on the forked member is a current collector 16 shown as a wheel herein, although other forms of collectors may be used, as for instance a sliding collector. A stud 17 secured by pins 18 and mounted in the chamber shown in the standards 8 and passing through the horizontal axis of the wheel 16 acts as the support for the wheel and permits it to revolve freely.

In order to reduce the contact resistance between the wheel and cable 23 as much as possible, I employ a U shaped flat spring contactor 19 of high conductivity metal mounted as shown and constantly pressing against the opposite faces of the collector. To the spring contactor 19 is secured by riveting, soldering, welding or brazing, a stem 20 preferably of copper or other high conductivity material which passes through a channel 21 in the stem 9. To maintain the spring contactor 19 in position I secure a member 22 to the lower end by screwthread engagement or otherwise and provided with a head seating against the lower face of the stem 9. In order to collect the current from the stem 20 and convey it to the cable 23 which connects to the trolley base or directly to the apparatus within the bus, I pivot an arm 24 on the body member 1 by means of the stud 25 and engage the arm with the member 22 and hold it in firm engagement with the member 22 by means of the spring 26. This engagement permits the forked member 7 and the member 22 to rotate relative to the arm 24, and with very little additional friction. To the arm 24 is secured a socket 27 in which the cable 23 is secured by soldering, brazing, etc., or by the screws 28.

The spring contactor 19, stud 20, member 22 and arm 24 being of high conducting material the tendency will be for the current to pass through these parts to the cable 23 thereby removing the necessity for all the current to pass from the fork member to the body member through the anti-friction steel balls 11.

The insulating member 3 is shown in its simplest form, namely an insulating member inserted into the socket 2 and end of pole 4, but there are other means of insulating the parts which may be substituted for that shown and the entire pole 4 may be of insulating material such as split bamboo, or other suitable wood.

It will be obvious to those skilled in the art that there may be many variations in details from those shown and described herein, which may be made, and which will come within the scope of my invention; therefore I do not wish to be limited other than by the following claims:—

1. A current collecting device comprising a body member, a support member, a current collecting element mounted on the support, anti-friction means interposed between the support and body member to permit rotation of the support member, means on the support member to rotate therewith to prevent fouling with overhead wires, current conducting means engaging the collecting element and rotating with the support, means engaging the collecting element to convey the current from the collecting element for the purpose described and insulating means on the body member to attach the device to means whereby the device is mounted on a bus.

2. A current collecting device comprising a body member, a support member, a current collecting element mounted on the support, anti-friction means interposed between the support and body member to permit rotation of the support member, means on the support member to rotate therewith to prevent fouling with overhead wires, current conducting means engaging the collecting element and rotating with the support, means engaging the collecting element to convey the current from the collecting element for the purpose described.

3. A current collecting device comprising a body member, a support mounted to rotate in the body member about a substantially vertical axis and a current conducting element mounted within the support and having exterior means of contact.

4. A current collecting device comprising a body member, a support mounted to rotate in the body member about a substantially vertical axis, a collecting element mounted on the support and means composed of high electrical conductivity material passing through the interior of the support and having one end engaging the collecting element and the other end provided with means to be engaged by a conductor to convey the current efficiently from the collecting element to the cable.

5. A current collecting device comprising a body member, a support mounted to rotate in the body member about a substantially vertical axis, a collecting element mounted on the support to rotate therewith, current conducting means mounted on the support to rotate therewith and engage the collecting element to conduct the current therefrom and means rotating with the support to prevent the device fouling with overhead construction.

6. A current collecting device comprising a body member, a support mounted to rotate in the body member about a substantially vertical axis, a collecting element mounted on the support to rotate therewith, current conducting means mounted on the support to rotate therewith and engage the collecting element to conduct the current therefrom and exteriorly mounted spring held means pivotally mounted on the body to engage the conducting means to conduct the current from the conducting means.

7. A current collecting device comprising a body member, a support mounted to rotate in the body member about a substantially vertical axis, a collecting element mounted on the support to rotate therewith, current conducting means mounted on the support to rotate therewith and engage the collecting element to conduct the current therefrom and spring held means to engage the conducting means to conduct the current from the conducting means.

8. A current collecting device comprising a body member, a support member mounted in the body member, a passage extending through the support member, a current collecting element mounted on the support, a current conducting means extending through the passage in the support and engaging the collecting element and resilient means mounted on the body member and engaging the current conducting element exterior of the passage for the purpose described.

9. A current collecting device comprising a body member, a support member mounted in the body member, a current collecting element mounted on the support, a current conducting means mounted on the support and engaging the collecting element and yielding means pivotally mounted on the body member and engaging the conducting means for the purpose described.

10. A current collecting device comprising a body member, a support mounted on the body member, a current collecting means mounted on the support, anti-friction means of high electrical resistance metal interposed between the support and body members and permitting free rotation of the support relative to the body member and conducting means of low electrical resistance for conducting the current from the collecting means to means for conveying the current to a bus on which the device is mounted.

11. A current collecting device comprising a body member, a support mounted to rotate in the body member about a substantially vertical axis, anti-friction means interposed between the support and body member to maintain the support and body member out of frictional engagement and a current conducting element mounted co-axially with and on the support.

12. A current collecting device comprising a body member, a support mounted for rotation on the body member, a current collecting element mounted on the support, means composed of high electrical conductivity metal for conveying current from the collecting element to the body member and insulating means secured to the body member for attachment to a trolley pole as described.

In testimony whereof I affix my signature.

SAMUEL S. MATTHES,